(12) United States Patent
Calavrezo et al.

(10) Patent No.: US 10,560,401 B2
(45) Date of Patent: Feb. 11, 2020

(54) NETWORK PACKET MICROBURST DETECTION VIA NETWORK SWITCHING DEVICE HARDWARE SUPPORTING QUANTIZIED CONGESTION NOTIFICATION

(71) Applicant: Lenovo Enterprise Solutions (Singapore) PTE. LTD., New Tech Park (SG)

(72) Inventors: Dan-Alexandru Calavrezo, Bucharest (RO); Corneliu-Ilie Calciu, Bucharest (RO); Gavril-Ioan Florian, Chitila (RO); Radu Mihai Iorga, Bucharest (RO)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 228 days.

(21) Appl. No.: 15/613,242

(22) Filed: Jun. 4, 2017

(65) Prior Publication Data
US 2018/0351883 A1 Dec. 6, 2018

(51) Int. Cl.
*H04L 12/801* (2013.01)
*H04L 12/931* (2013.01)
(52) U.S. Cl.
CPC ............ *H04L 49/506* (2013.01); *H04L 47/11* (2013.01)
(58) Field of Classification Search
CPC ....................................................... H04L 47/11
See application file for complete search history.

(56) References Cited

U.S. PATENT DOCUMENTS

2016/0065426 A1* 3/2016 Calavrezo ............... H04L 47/11
370/229

OTHER PUBLICATIONS

IEEE 802.1Qau-2010, Virtual Bridged Local Area Networks—Amendment 13: Congestion Control, IEEE, Apr. 2010 (Year: 2010).*
Thaler, Patricia, IEEE 802.1Q Congestion Notification Overview, Broadcom, IETF Berlin, Germany, Jul. 2013, 26 pp.
Yasuda, Masato et al., Data Center Quantized Congestion Notification (QCN): Implementation and Evaluation on NetFPGA, Jun. 14, 2010, 23 pp.
Alizadeh, Mohammad et al., "Data Center Transport Mechanisms: Congestion Control Theory and IEEE Standardization", Forty-Sixth Annual Allerton Conference, Allerton House, UIUC, Illinois, USA, Sep. 23-26, 2008, pp. 1270-1277.

(Continued)

*Primary Examiner* — Kent Krueger
(74) *Attorney, Agent, or Firm* — Kunzler Bean & Adamson, PC; Bruce R. Needham (57) ABSTRACT

Hardware of a network switching device supports quantized congestion notification (QCN) to notify senders of network packets received at the network switching device that the network switching device is experiencing congestion. The hardware is instead programmed to notify a processor of the network switching device of the congestion at an egress queue of the network switching device. The processor receives a congestion notification message (CNM) from the hardware that the hardware has detected the congestion at the egress queue. Responsive to receiving the CNM from the hardware, the processor detects a microburst of the network packets at the egress queue of the network switching device.

20 Claims, 3 Drawing Sheets

(56) References Cited

OTHER PUBLICATIONS

"QCN-SP Pseudo-code" Revision 1, available online at http://www.ieee802.org/1/pages/802.1au.html, Oct. 18, 2017, 7 pp.
"Latency Analyzer (LANZ), A New Dimension in Network Visibility", ARISTA, online <https://www.arista.com/assets/data/pdf/TechBulletins/Lanz.pdf>, 2016, 5 pp.
"VLANs set to enhance their value through policy-based management," Network World, Aug. 14, 1995, p. 23.

\* cited by examiner

NETWORK PACKET MICROBURST DETECTION VIA NETWORK SWITCHING DEVICE HARDWARE SUPPORTING QUANTIZIED CONGESTION NOTIFICATION

BACKGROUND

Network switching devices, like network switches, are networking devices that interconnect other devices over a network. For example, a network switch may have a number of network ports. Each network port is connectable to another device, which can include an endpoint device like a server or other type of computer, or another network device, like another switch, a router, and so on. A network switch thus sends and receives network packets over its ports to permit connected devices to communicate with one another and over a network.

SUMMARY

An example method include programming hardware of a network switching device that supports quantized congestion notification (QCN) to notify senders of network packets received at the network switching device that the network switching device is experiencing congestion at the network switching device to instead notify a processor of the network switching device of the congestion at an egress queue of the network switching device. The method includes receiving, by the processor of the network switching device, a congestion notification message (CNM) from the hardware that the hardware has detected the congestion at the egress queue of the network switching device. The method includes, responsive to receiving the CNM from the hardware, detecting, by the processor of the network switching device, a microburst of the network packets at the egress queue of the network switching device.

An example network switching device includes ports at which network packets are received and sent, and an egress queue associated with the ports and at which the network packets are queued for transmission over the ports. The network switching devices includes a memory storing computer-executable code, and a processor to execute the computer-executable code. The network switching devices includes hardware supporting QCN to detect congestion at the egress queue and that is programmed to notify the processor of the congestion at the egress queue instead of network senders that sent the network packets of the congestion at the network switching device. The processor is to execute the computer-executable code to receive a CNM from the hardware that the hardware has detected the congestion at the egress queue, and to responsively detect a microburst of the network packets at the egress queue.

An example non-transitory computer-readable data storage medium stores computer-executable code that a processor of a network switching device. The processor executes the code to receive a CNM from hardware of the network switching device supporting QCN to notify senders of network packets received at the network switching device is experiencing congestion at the network switching device. The CNM indicates that the hardware has detected the congestion at an egress queue of the network switching device. The processor executes the code to, responsive to receipt of the CNM from the hardware, detect a microburst of the network packets at the egress queue of the network switching device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, a network switching device, like a network switch, send and receive network ports over its ports to permit devices connected to the ports to communicate with one another as well as over a network. As such, when a network switch receives a network packet at one of its ports, the switch has to determine out of which port to send the packet so that the packet arrives at the proper destination. Because packets may arrive more quickly than they can be sent, and because packets may arrive over multiple ports that are to be sent out of the same port, a network switch has a buffer, or queue, to temporarily store packets until they can be sent.

Network switches are susceptible to microbursts. A microburst is a short spike of packets, arriving at a network switch at a rate exceeding the processing speed of the switch (i.e., the speed at which the switch can send the packets from its ports). Packets are placed in a queue, and if the queue fills to capacity, are lost. In other words, a microburst is a rapid burst of network packets received in quick succession, but which lasts for just a short length of time. A microburst can arise when a higher-speed network traffic source transmits data to lower-speed network traffic destination.

For instance, a local-area network (LAN) switch may support multiple link speeds, such as ten megabits per second (Mbps), 100 Mbps, one gigabit per second (gbps), ten gbps, and so on. Consider an example of a flow of 250-byte packets from a ten gbps ingress link to a 100 Mbps egress link. The network switch may have one port connected to a network source with which the switch is capable of communicating at a rate of ten gbps, for instance, and another port connected to a network destination with which the switch is capable of communicating at a rate of 100 Mbps.

A ten millisecond traffic burst of the ten gbps ingress link will feed 50,000 packets into the switch, while the egress link can clear just 500 packets during this same period of time, resulting in 49,500 packets for the switch to process. The switch may have an eight-megabyte (MB) queue, which is sufficient for 32,000 packets. This means that during the ten-millisecond period of time in which there is a network microburst, 17,500 packets or 35% of the packets will be lost.

The network source may retransmit the lost packets as soon as the loss is discovered. The retransmission delay is typically of an order of a round-trip latency. The lost packets thus form a subsequent network microburst of 17,500 packets arriving over a 3.5 millisecond period after a phase delay of the initial microburst. If the round-trip latency is short, this second microburst will arrive before the queue has been cleared of the earlier received packets. As such, additional packet loss and retransmission may be incurred.

Microbursts are difficult to detect. For example, a ten millisecond microburst every second may utilize just one percent of link capacity. Such low link utilization is not expected to result in packet loss. Therefore, when network problems occur, administrators may be unable to pinpoint the source of these problems, because microbursts are not identified as the culprit.

Existing network switches usually detect microbursts by software polling. A processor of a network switch executes a software entity, such as a process or a thread, which polls the queue size of every queue of the switch at short intervals to determine potential microbursts. Because a microburst occurs at a sub-second level, the polling interval has to be exceedingly small.

However, network switches are being equipped with greater numbers of ports, such as 48 ports, and with greater numbers of egress queues, such as eight or more such queues. This means that for a 48-port network switch having eight egress queues, 7,680 discrete polling inquiries have to be performed every second to achieve just a 50-millisecond polling interval. Many network switches do not have processors that are capable of achieving this many polling inquiries. Even if a switch has a sufficiently powerful process to perform so many inquiries, the overhead required can mean that the switch cannot dedicate processor cycles to other tasks.

Techniques disclosed herein leverage modern network switching devices' built-in hardware support for quantized congestion notification (QCN) to instead novelly detect network microbursts. Many network switches, for instance, have application-specific integrated circuits (ASICs) that support QCN as dictated by the IEEE 802.11qau standard, which has been incorporated into the IEEE 802.1Q-2011 standard. Such a QCN protocol contemplates a congestion point (CP), a reaction point (RP), and congestion notification.

The QCN-supporting hardware of a network switch samples network packets as they are placed in a queue. When network congestion occurs in the queue, as the CP, the hardware sends a congestion notification message (CNM) to the network source(s) of the sampled network packets, as RPs. When a network source, or RP, receives a CNM, it throttles back its sending rate in accordance with the QCN protocol in question to resolve the congestion at the queue, or CP. The rate at which network packets are sampled can be probabilistic, and increase to a probabilistic maximum rate in correspondence with an increase in a measure of network congestion at the queue.

The techniques described herein instead direct such CNMs internally to the processor of a network switch, rather than externally to the network source(s), or RPs, of the network packets. By tuning the parameters of the QCN protocol by which the ASIC or other hardware of the switch, the QCN-supporting hardware of the switch can thus be employed to instead detect network microbursts. Upon receiving a CNM from the QCN-supporting hardware of a network switch, the processor of this switch can notify a network administrator and may perform a remediation action to minimize the potential for packet loss. In this way, the "CP side" of the QCN protocol that the ASIC or other hardware of a switch is employed to detect microbursts, without using the "RP side" that involves the source of the packets causing the congestion as in conventional QCN usage and design.

Figure 1:
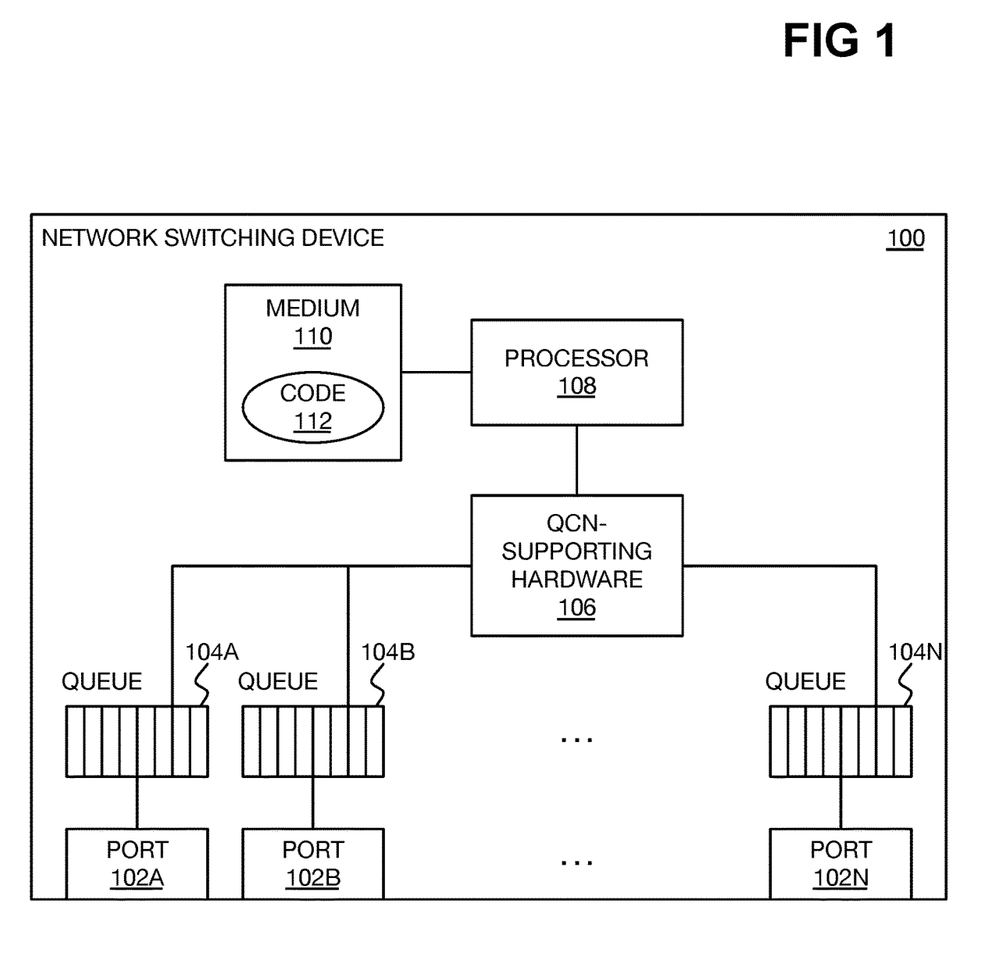
FIG. 1 is a diagram of an example network switching device.

FIG. 1 shows an example network switching device 100. The network switching device 100 may be a network switch, or another type of network device that has switching capability, such as a network router. The network switching device 100 includes a number of network ports 102A, 102B, . . . , 102N, collectively referred to as the network ports 102. There may be eight, sixteen, twenty-four, thirty-two, forty-eight, or another number of network ports 102. Each network port 102 is connectable to an endpoint device, such as a server or another type of computer, or another network device, such as another switch, a router, a modem, and so on. The network ports 102 may be Ethernet network ports, such as those having RJ45 form factors, receptive to corresponding network cables. The network switching device 100 can send and receive network packets on each network port 102.

The network switching device 100 includes a number of egress queues 104A, 104B, . . . , 104N, collectively referred to as the egress queues 104. Each egress queue 104 corresponds to a network port 102, in one-to-one correspondence. The network switching device 100 may have a total amount of volatile memory, such as dynamic random-access memory (DRAM), which can be dedicated for the egress queues 104. The memory may be divided equally into the egress queues 104, so that each queue 104 has a same maximum size, or may be divided unequally, so that some queues 104 are larger than other queues 104. Each egress queue 104 may be eight MB in size, for example. When a network packet is received on a network port 102 for transmission over another network port 102, the packet is placed in the egress queue 104 corresponding to the latter port 102 until the packet can be transmitted from the network switching device 100 over the network port 102 in question. Network packets are therefore queued within an egress queue 104 for transmission over a corresponding network port 102.

The network switching device 100 includes hardware 106 that supports QCN. The hardware 106 may be an ASIC, for instance. The hardware 106 is not a general purpose processor that executes computer-executable code. The hardware 106 supports QCN, such as that delineated by the IEEE 802.11qau standard that has been incorporated into the IEEE 802.1Q-2011 standard. By supporting QCN, the hardware 106 can detect congestion at each egress queue 104 in accordance with a QCN algorithm. When the hardware 106 detects congestion at an egress queue 104 corresponding to a network port 102 at a currently sampled packet within the queue 104, it generates and sends a CNM. Conventional QCN dictates that the hardware 106 sends the CNM to the source of the currently sampled packet, which is an endpoint device directly connected to one of the other network ports 102, or that is reachable through a network device directly connected to one of the other ports 102.

The network switching device 100 includes a processor 108 and a computer-readable data storage medium 110, or memory, storing computer-executable code 112. The processor 108 is a general purpose processor and that can execute the code 112 from the medium 110 to run software, such as in the form of a process or a thread. The QCN-supporting hardware 106 is novelly programmed to send a CNM internally within the network switching device 100, specifically to the processor 108, when congestion occurs within an egress queue 104 corresponding to a network port 102 at a currently sampled packet within the queue 104, instead of externally to the source of the packet. In this way, network microbursts can be detected within the egress queues 104, via leveraging the hardware that supports QCN, instead of the processor 108 having to poll each egress queue 104 at a frequency sufficient to detect such microbursts. The processor 108 can execute the code 112 to notify the user responsive to receipt of a CNM from the hardware 106, or to perform a remediation action to minimize network packet loss resulting from the network microburst.

The processor 108 detects a network microburst responsive to receiving a CNM from the hardware 106. Stated another way, the processor 108 interprets or corresponds the receipt of a CNM as a network microburst occurring within an egress queue 104 to which the CNM corresponds. Therefore, the QCN algorithm that the hardware 106 performs is novelly leveraged to detect network microbursts within the processor 108, instead of to notify network senders of network packets that resulted in congestion within the egress queues 104.

Figure 2A:
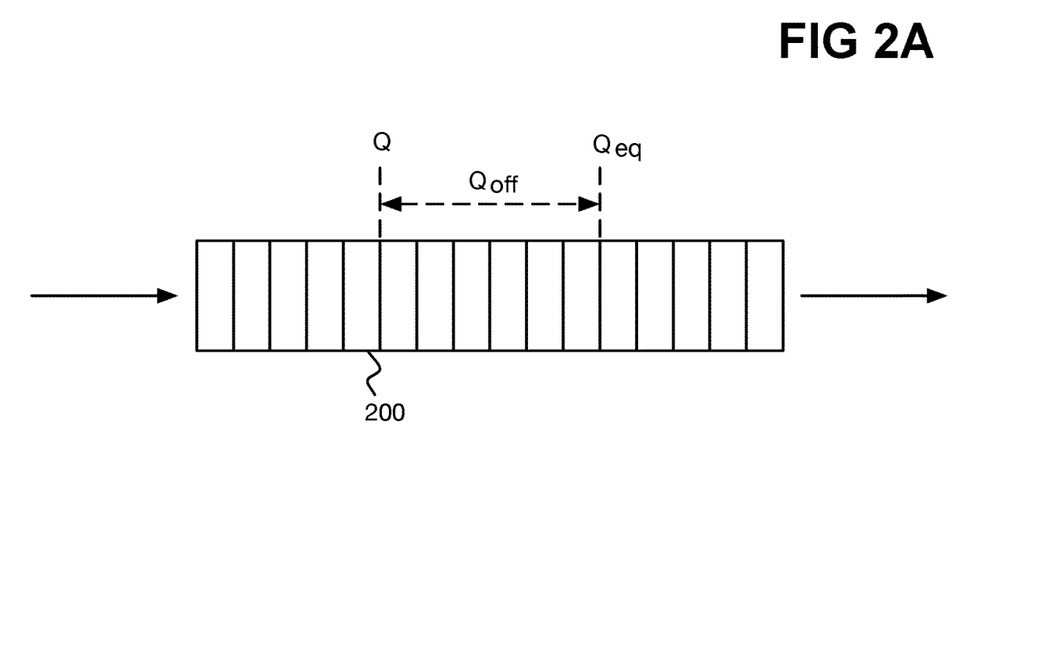
FIGS. 2A and 2B are diagrams of an example egress queue and an example network packet sampling rate graph, respectively.
Figure 2B:
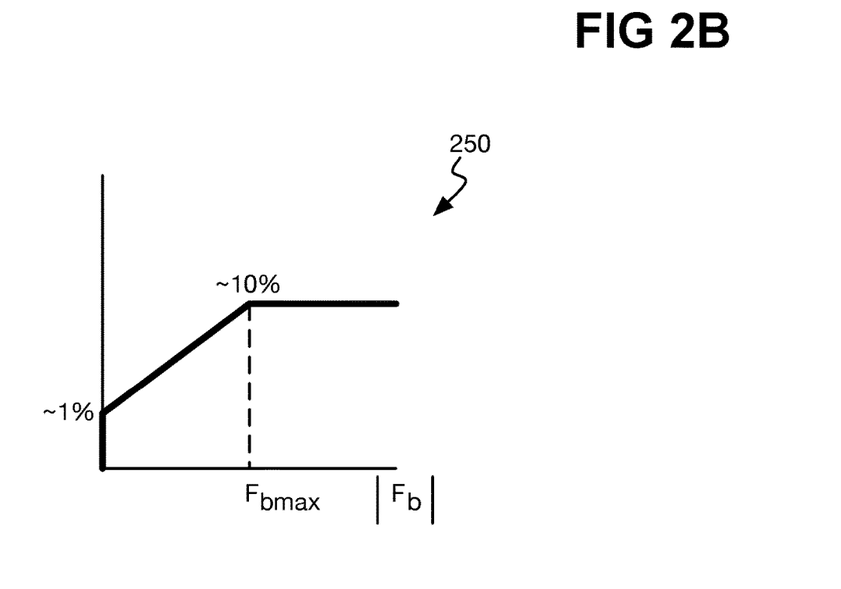

FIGS. 2A and 2B show an example egress queue 200 and an example graph 250, respectively, in relation to which an example QCN algorithm that the hardware 106 performs to detect congestion within the queue 200 is described. The egress queue 200 of FIG. 2A can represent any egress queue 104. The queue 200 has an equilibrium queue size Qeq, which is the optimal, or equilibrium, size of the queue 200 that is desired to be maximally filled with network packets at any point in time. The equilibrium queue size is not the maximum, or actual, size of the queue 200, but rather is a percentage of the maximum size of the queue 200, such as 20%. The maximum size of the queue 200 is the size of the queue 200 beyond which no further network packets can be buffered in the queue 200. The network switching device 100 attempts to transmit network packets from the network port 102 to which the queue 200 corresponds so that the current size of the queue 200 is maintained at or below the equilibrium queue size.

The egress queue 200 has a current queue size Q, which is the portion of the queue 200 that is currently filled with network packets when a network packet entering the queue 200 is currently being sampled. The current queue size may also be referred to as the instantaneous queue size at a currently sampled network packet entering the queue 200. A current queue size excess Qoff is defined as the difference between the current queue size and the equilibrium queue size, or Qoff=Q−Qeq. A current queue size rate excess Qdelta is defined as the difference between the current queue size and the previous queue size of the queue 200 the last time a network packet entering the queue 200 was sampled prior to the current time. The previous queue size is referred to as Qold, such that Qdelta=Q−Qold. The current queue size rate excess is effectively the derivative of the queue size and equals the input rate less the output rate.

The hardware 106 generates, each time a network packet is sampled at the egress queue 200, a congestion measure Fb, which is the current or instantaneous measure of congestion within the queue 200. The congestion measure can be equal to the negative of the sum of the current queue size excess and the product of a weight and the current queue size rate excess, or Fb=−(Qoff+wQdelta). The weight w may be set to two. The congestion measure thus captures a combination of the queue size excess and the rate excess. When the congestion measure is negative, the queue 200 or the egress link (i.e., the network port 102 to which the queue 200 corresponds) is oversubscribed. The hardware 106 sends a CNM to the processor 108 when the congestion measure is negative.

The graph 250 of FIG. 2B depicts the sampling rate of network packets entering the egress queue 200 as a function of the absolute value of the congestion measure, when the congestion measure is negative (i.e., when congestion has been detected within the queue 200). Stated another way, the graph 250 depicts the likelihood that the hardware 100 will send a CNM to the processor 108 when there is congestion within the queue 200. When the congestion measure is positive, no CNM is sent to the processor 108 from the hardware 100. The graph 250 depicts that as congestion increases, the sampling rate increases to a maximum of about 10%; any further increase in the absolute congestion measure above Fbmax does not result in any further increase in this rate. The graph 250 also depicts that as congestion decreases, the sampling rate decreases to a minimum of about 1%.

The sampling rate can be probabilistically determined. As such, the sampling rate may not be exactly 10% at the maximum, but probabilistically 10%. Likewise, the sampling rate may not be exactly 1% at the minimum, but probabilistically 1%. In one implementation, this can be achieved by randomizing the sampling rate depicted in the graph 250 by +/−10-20%. The QCN algorithm describes the sampling rate of network packets entering the egress queue 200, because the algorithm contemplates sending CNMs to the senders of the sampled network packets when congestion is detected. However, which network packet is actually sampled may not matter in the techniques described herein (i.e., the sender of each sampled network packet may not matter), because the receiver of the CNM that the hardware 106 remains the processor 108 of the network switching device 100 regardless. The sampling rate nevertheless corresponds to the interval at which the hardware 106 determines whether the queue 200 is currently experiencing congestion. The sampling rate corresponding to the magnitude of the congestions within the queue 200.

Figure 3:
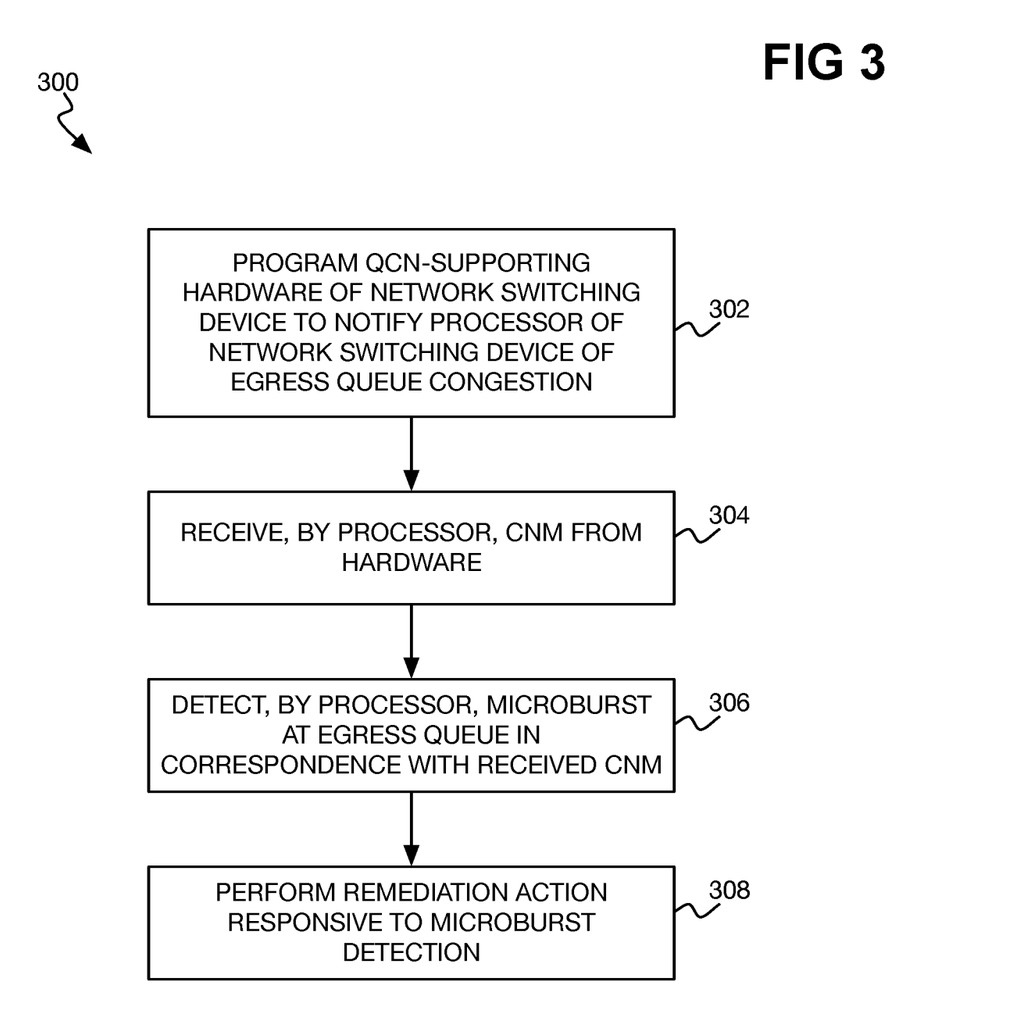
FIG. 3 is a flowchart of a method for detecting a network microburst using the quantized congestion notification (QCN) capability of hardware of a network switching device.

FIG. 3 shows a method 300 for using the QCN capability of the hardware 106 of a network switching device 100 to instead detect network microbursts at an egress queue 200 of the network switching device 100. The QCN-supporting hardware 106 is programmed to notify the processor 108 of congestion at the egress queue 200 instead of notifying the senders of sampled network packets when such congestion occurs (302). Stated another way, the hardware 106 is programmed so that CNMs are sent internally within the network switching device 100 to the processor 108, instead of externally from the device 100 to the sender of the sampled packets.

Programming the QCN-supporting hardware 106 can include specifying a congestion point identifier (CPID) field of the CNM to identify the egress queue 200 at which the hardware 106 has detected congestion. The CPID field of a CNM in accordance with the IEEE 802.11qau standard is an eight-byte field that is not ordinarily used by the RPs of the QCN algorithm i.e., by the network senders or sources of the sampled network packets when congestion is detected. The CPID field can also specify the port 102 with which the egress queue 200 is associated. The identification of the egress queue 200 within conventional performance of a QCN algorithm in which an external RP is notified of congestion is unnecessary and not useful, because an external sender or source of a sampled networked packet cannot use this information. However, because the processor 108 is internal to the network switching device 100 and may be able to perform a remediation action in relation to the queue 200 to minimize the potential for network packet loss resulting from a detected microburst, identification of the particular queue 200 in question is by comparison useful.

Programming the QCN-supporting hardware 106 can include adjusting or tuning various parameters of the QCN algorithm that the hardware 106 employs so that the hardware 106 sends a CNM (i.e., detects network congestion) in correspondence with a microburst particularly occurring at an egress queue 200. That is, not all network congestion may signify a microburst. Because the processor 108 is leveraging and relying upon the ability of the hardware 106 to detect congestion as a way to detect a microburst without the processor 108 having to poll the queue 200 itself, the parameters of the QCN algorithm are desirably adjusted so that just microbursts are detected, and not congestion more generally. Such parameter adjustment can be performed adaptively in an iterative process upon manual analysis of the egress queue 200 vis-à-vis the sending of CNMs, to ensure that the hardware 106 is indeed sending CNMs in correspondence with microburst occurrences.

The parameters of the QCN algorithm of the hardware 106 that can be adjusted can include the weight w by which the current queue size rate excess Qdelta is multiplied in computing the congestion measure Fb. The parameters that can be adjusted can include the equilibrium queue size Qeq that is used to compute the current queue size excess Qoff. The parameters that can be adjusted can include a sampling parameter that governs the frequency at which the hardware 106 inspects an egress queue 200 for congestion. The sampling parameter in this respect can be the function such as a probabilistic function of the congestion measure Fb that is used to compute the sampling rate, as depicted in the graph 250 of FIG. 2B. The QCN algorithm parameters are normally set to detect network congestion generally, and thus are instead adjusted so that microbursts are specifically detected.

Once the QCN-supporting hardware 106 of the network switching device 100 has been programmed, when the hardware 106 detects congestion at an egress queue 200, it sends a CNM to the processor 108, which receives the CNM (304). The CNM can include in its CPID field the identity of the queue 200 at which congestion has occurred, and the network port 102 associated with this queue 200, as noted above. Therefore, the processor 108 is able to identify the particular queue 200 at which the hardware 106 has detected congestion when performing QCN in accordance with a sampled network packet. It is noted that unlike conventionally, the identity of the network packet that was sampled during congestion detection may not be of use to the processor 108. The processor 108 is rather focused on the queue 200 at which the hardware 106 has detected congestion, as opposed to the sender or source of the sampled network packet, which is the RP in conventional QCN.

The processor 108 responsively detects a network microburst at the egress queue 200 in correspondence with the CNM received from the QCN-supporting hardware 106 (306). Stated another way, the processor 108 interprets the receipt of a CNM from the hardware 106 as indication that a microburst has occurred at the queue 200 identified in the CNM. From the perspective of the hardware 106, the CNM is sent in occurrence with congestion generally; however, from the perspective of the processor 108, the CNM is received in occurrence with a microburst specifically. As such, the techniques described herein novelly employ the QCN capability built into the hardware 106 to instead detect microbursts, which can be internally acted upon within the network switching device 100, specifically by the processor 108 that receives CNMs from the hardware 106.

Therefore, the processor 108 can perform a remediation action responsive to the detection of a microburst at the egress queue 200 (308). The remediation action minimizes network packet loss at the egress queue 200. For example, the queue 200 may be reconfigured so that a larger amount of the DRAM available to dedicate to buffers is allotted to the queue 200, to decrease the occurrence of subsequent microbursts. As another example, a network policy governing the network switching device 100 may be reconfigured so that network traffic can at least in part be offloaded from the device 100 to another network switching device to alleviate microbursts at the device 100.

The techniques that have been described thus permit network microbursts to be detected within network switching devices, like network switches, without taxing the processors of the devices by forcing the processors to perform polling of the egress queues associated with the network packets in software. Rather, existing built-in capability of hardware of the network switching devices, such as ASICs thereof, to perform QCN is leveraged to instead particularly detect microbursts. The hardware routes CNMs not to the sources or senders of sampled network packets (i.e., the QCN RPs), but rather sends the CNMs internally to the processor of the network switching device of which the hardware is a part.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   programming hardware of a network switching device that supports quantized congestion notification (QCN) to notify senders of network packets received at the network switching device that the network switching device is experiencing congestion at the network switching device to instead notify a processor of the network switching device of the congestion at an egress queue of the network switching device;
   receiving, by the processor of the network switching device, a congestion notification message (CNM) from the hardware that the hardware has detected the congestion at the egress queue of the network switching device; and responsive to receiving the CNM from the hardware, detecting, by the processor of the network switching device, a microburst of the network packets at the egress queue of the network switching device.

2. The method of claim 1, further comprising:
responsive to detection of the microburst of the network packets at the egress queue of the network switching device, performing a remediation action to minimize network packet loss resulting from the microburst.

3. The method of claim 1, wherein programming the hardware that supports the QCN comprises:
specifying a congestion point identifier (CPID) field of the CNM to identify a queue of the network switching device at which the congestion has been detected and a port of the network switching device with which the queue is associated.

4. The method of claim 1, wherein programming the hardware that supports the QCN comprises:
adjusting a weight of a QCN algorithm that the hardware of the network switching device uses to detect the congestion at the egress queue, the weight adjusted so the hardware detects the congestion at the egress queue in correspondence with occurrence of the microburst at the egress queue.

5. The method of claim 4, wherein programming the hardware that supports the QCN further comprises:
adjusting an equilibrium queue size of the QCN algorithm so the hardware detects the congestion at the egress queue in correspondence with the occurrence of the microburst at the egress queue.

6. The method of claim 5, wherein programming the hardware that supports the QCN further comprises:
adjusting a sampling parameter of the QCN algorithm governing a frequency at which the hardware inspects the egress queue for the congestion so the hardware detects the congestion at the egress queue in correspondence with the occurrence of the microburst at the egress queue.

7. The method of claim 1, wherein the microburst of the network packets is defined as a spike in the network packets arriving at the network switching device exceeding a speed at which the network switching device is able to process the network packets and send the network packets from the network switching device.

8. A network switching device comprising:
a plurality of ports at which network packets are received and sent;
an egress queue associated with the ports and at which the network packets are queued for transmission over the ports;
a memory storing computer-executable code;
a processor to execute the computer-executable code; and
hardware supporting quantized congestion notification (QCN) to detect congestion at the egress queue and that is programmed to notify the processor of the congestion at the egress queue instead of network senders that sent the network packets of the congestion at the network switching device,
wherein the processor is to execute the computer-executable code to receive a congestion notification message (CNM) from the hardware that the hardware has detected the congestion at the egress queue, and to responsively detect a microburst of the network packets at the egress queue.

9. The network switching device of claim 8, wherein the processor is to execute the computer-executable code to, in response to detection of the microburst, perform a remediation action to minimize network packet loss resulting from the microburst.

10. The network switching device of claim 8, wherein the hardware supports the QCN by sampling a queue size of the egress queue at a sampling rate corresponding to a magnitude the congestion.

11. The network switching device of claim 8, wherein the hardware supports the QCN to detect the congestion by determining that a congestion measure based on a current queue size excess of the egress queue and based on a weighed queue size rate excess of the egress queue has a negative value.

12. The network switching device of claim 11, wherein the congestion measure is equal to a negative of a sum of the current queue size excess and the weighted queue size rate excess.

13. The network switching device of claim 11, wherein the current queue size excess is equal to a current queue size of the egress queue minus an equilibrium queue size of the egress queue.

14. The network switching device of claim 13, wherein the weighted queue size rate excess is equal to a product of a weight and a queue size rate excess of the egress queue, and wherein the queue size rate excess is equal to the current queue size of the egress queue minus a previous queue size of the egress queue.

15. The network switching device of claim 8, wherein the microburst of the network packets is defined as a spike in the network packets arriving at the ports exceeding a speed at which the network switching device is able to send the network packets from the ports.

16. A non-transitory computer-readable data storage medium storing computer-executable code that a processor of a network switching device executes to:
receive a congestion notification message (CNM) from hardware of the network switching device supporting quantized congestion notification (QCN) to notify senders of network packets received at the network switching device is experiencing congestion at the network switching device, the CNM indicating that the hardware has detected the congestion at an egress queue of the network switching device; and
responsive to receipt of the CNM from the hardware, detect a microburst of the network packets at the egress queue of the network switching device.

17. The non-transitory computer-readable data storage medium of claim 16, wherein the processor of the network switching device executes the computer-executable code to further:
responsive to detection of the microburst of the network packets at the egress queue, perform a remediation action to minimize network packet loss resulting from the microburst.

18. The non-transitory computer-readable data storage medium of claim 16, wherein the CNM comprises a congestion point identifier (CPID) field identifying the egress queue of the network switching device at which the hardware has detected the congestion and a port of the network switching device with which the queue is associated.

19. The non-transitory computer-readable data storage medium of claim 16, wherein the processor interprets the congestion notification message received from the hardware as occurrence of the microburst.

20. The non-transitory computer-readable data storage medium of claim 16, wherein the microburst of the network packets is defined as a spike in the network packets arriving at the network switching device exceeding a speed at which the network switching device is able to process the network packets and send the network packets from the network switching device.

* * * * *